(12) United States Patent
Gillette et al.

(10) Patent No.: US 11,231,536 B2
(45) Date of Patent: Jan. 25, 2022

(54) POLARIZER

(71) Applicant: 3M INNOVATIVE PROPERTIES COMPANY, St. Paul, MN (US)

(72) Inventors: Kristy A. Gillette, Spring Valley, WI (US); James E. Lockridge, St. Paul, MN (US); Brianna N. Nieson, Bloomington, MN (US); Joan M. Noyola, Maplewood, MN (US); Jason S. Petaja, Hudson, WI (US); Matthew B. Johnson, Woodbury, MN (US); Jeffrey W. Hagen, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 1 day.

(21) Appl. No.: 16/318,836

(22) PCT Filed: Aug. 3, 2017

(86) PCT No.: PCT/US2017/045305
§ 371 (c)(1),
(2) Date: Jan. 18, 2019

(87) PCT Pub. No.: WO2018/034854
PCT Pub. Date: Feb. 22, 2018

(65) Prior Publication Data
US 2019/0285787 A1 Sep. 19, 2019

Related U.S. Application Data

(60) Provisional application No. 62/375,479, filed on Aug. 16, 2016.

(51) Int. Cl.
| | | |
|---|---|---|
| *B32B 27/08* | (2006.01) | |
| *B32B 7/02* | (2019.01) | |
| *G02B 5/30* | (2006.01) | |
| *B29D 11/00* | (2006.01) | |
| *B29K 29/00* | (2006.01) | |

(52) U.S. Cl.
CPC ........ *G02B 5/305* (2013.01); *B29D 11/00644* (2013.01); *B32B 7/02* (2013.01); *B32B 27/08* (2013.01); *B29K 2029/04* (2013.01); *B29K 2995/0018* (2013.01)

(58) Field of Classification Search
None
See application file for complete search history.

(56) References Cited

U.S. PATENT DOCUMENTS

| | | | |
|---|---|---|---|
| 4,166,871 A | 9/1979 | Schuler | |
| 4,659,523 A | 4/1987 | Rogers | |
| 4,895,769 A | 1/1990 | Land | |
| 5,066,108 A | 11/1991 | McDonald | |
| 5,882,774 A | 3/1999 | Jonza | |
| 6,096,375 A | 8/2000 | Ouderkirk | |
| 6,111,697 A | 8/2000 | Merrill | |
| 6,549,335 B1 | 4/2003 | Trapani | |
| 6,697,195 B2 | 2/2004 | Weber | |
| 6,916,440 B2 | 7/2005 | Jackson | |
| 6,936,960 B2 | 8/2005 | Cok | |
| 7,301,594 B2 | 11/2007 | Yu | |
| 7,826,009 B2 | 11/2010 | Weber | |
| 8,305,547 B2 | 11/2012 | Hatsuda | |
| 8,320,042 B2 | 11/2012 | Goto | |
| 8,379,169 B2 | 2/2013 | Kitagawa | |
| 8,411,360 B2 | 4/2013 | Kitagawa | |
| 8,551,284 B2 | 10/2013 | Ishibashi | |
| 8,709,567 B2 | 4/2014 | Kitagawa | |
| 8,721,816 B2 | 5/2014 | Kitagawa | |
| 8,852,374 B2 | 10/2014 | Goto | |
| 9,069,137 B2 | 6/2015 | Bae | |
| 9,102,131 B2 | 8/2015 | Derks | |
| 2003/0170478 A1 | 9/2003 | Cael | |
| 2004/0135499 A1 | 7/2004 | Cok | |
| 2006/0227423 A1 | 12/2006 | Saiki | |
| 2007/0047080 A1 | 3/2007 | Stover | |
| 2007/0076150 A1* | 4/2007 | Hale | G02F 1/133634 349/117 |
| 2007/0228586 A1 | 10/2007 | Merrill | |
| 2008/0192345 A1 | 8/2008 | Mochizuki et al. | |

(Continued)

FOREIGN PATENT DOCUMENTS

| | | |
|---|---|---|
| CN | 101137917 | 3/2008 |
| CN | 103261928 | 8/2013 |
| CN | 104995536 | 10/2015 |
| EP | 2394805 | 12/2011 |
| JP | 2003-307623 | 10/2003 |
| JP | 2007-058176 | 3/2007 |
| JP | 2010-009063 | 1/2010 |
| JP | 2013-105036 | 5/2013 |
| JP | 2014-205826 | 10/2014 |

(Continued)

OTHER PUBLICATIONS

International Search Report for PCT International Application No. PCT/US2017/045305, dated Nov. 15, 2017, 4 pages.

*Primary Examiner* — Sheeba Ahmed
(74) *Attorney, Agent, or Firm* — Clifton F. Richardson

(57) ABSTRACT

A polarizer including an oriented polymeric first layer is described. The oriented polymeric first layer is preparable from a mixture of polyvinyl alcohol and crosslinker where the crosslinker is included in the mixture at 5 to 40 percent by weight based on the total weight of the polyvinyl alcohol and crosslinker. The oriented polymeric first layer is a substantially uniaxially drawn layer, in that for $U=(1/\text{MDDR}-1)/(\text{TDDR}^{1/2}-1)$, U is at least 0.85, with MDDR being a machine direction draw ratio and TDDR being a transverse direction draw ratio.

12 Claims, 6 Drawing Sheets

(56) References Cited

U.S. PATENT DOCUMENTS

| | | | |
|---|---|---|---|
| 2010/0118399 A1* | 5/2010 | Umemoto | B29C 65/48 359/485.01 |
| 2011/0019280 A1 | 1/2011 | Lockridge | |
| 2012/0003400 A1 | 1/2012 | Nishimura | |
| 2017/0235024 A1 | 8/2017 | Xu et al. | |

FOREIGN PATENT DOCUMENTS

| | | |
|---|---|---|
| KR | 10-2013-0050127 | 5/2013 |
| KR | 10-2015-0039982 | 4/2015 |
| WO | WO 2006-107977 | 10/2006 |
| WO | WO 2014-130283 | 8/2014 |
| WO | WO 2016-205130 | 12/2016 |

* cited by examiner

POLARIZER

BACKGROUND

Absorbing polarizers can be prepared by stretching a polyvinyl alcohol layer in order to align the polyvinyl alcohol molecules in the layer and staining the aligned layer with iodine. Such polarizers have been used in various display applications.

SUMMARY

In some aspects of the present description, a polarizer including an oriented polymeric first layer is provided. The oriented polymeric first layer is preparable from a mixture containing polyvinyl alcohol and crosslinker with the crosslinker included in the mixture at 5 to 40 percent by weight based on the total weight of the polyvinyl alcohol and crosslinker. The oriented polymeric first layer is a substantially uniaxially drawn layer, in that for $U=(1/MDDR-1)/(TDDR^{1/2}-1)$, U is at least 0.85, where MDDR is a machine direction draw ratio and TDDR is a transverse direction draw ratio.

In some aspects of the present description, a method of making a polarizer having an oriented polymeric first layer is provided. The method includes forming a mixture of polyvinyl alcohol and a crosslinker in a solvent; coating the mixture onto a second layer; drying the mixture to remove the solvent, thereby forming a dried coating; stretching the coated second layer to orient the dried coating, thereby forming the oriented polymeric first layer. A weight of the crosslinker included in the mixture divided by a sum of the weight of the crosslinker and a weight of the polyvinyl alcohol is in a range of 0.05 to 0.3. Stretching the coated second layer includes conveying the coated second layer within a stretcher along a machine direction while holding opposing edge portions of the coated second layer and stretching the coated second layer within the stretcher by moving the opposing edge portions along diverging non-linear paths.

DETAILED DESCRIPTION

Figure 1:
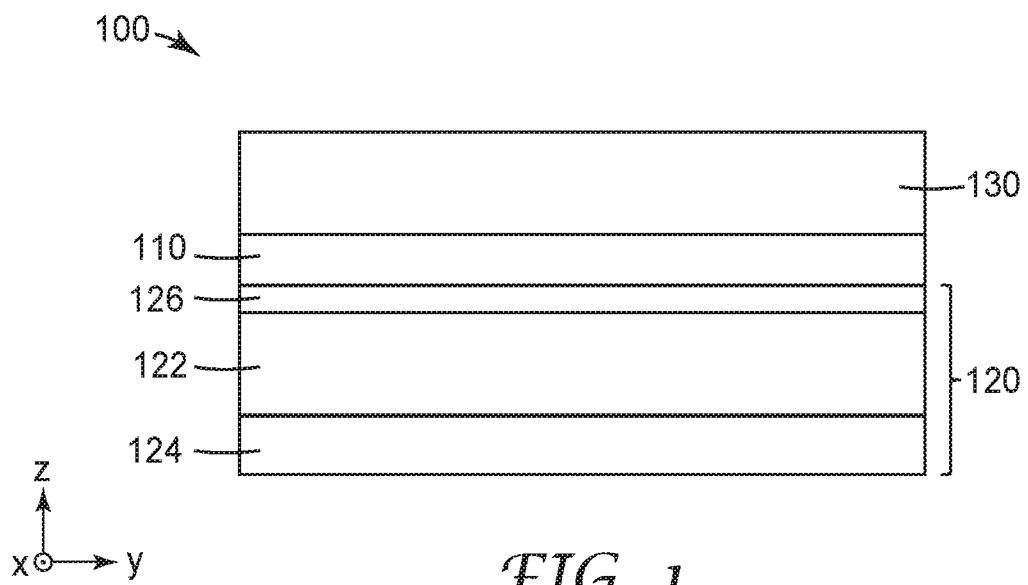
FIG. 1 is a cross-sectional view of a polarizer.

In the following description, reference is made to the accompanying drawings that forms a part hereof and in which various embodiments are shown by way of illustration. The drawings are not necessarily to scale. It is to be understood that other embodiments are contemplated and may be made without departing from the scope or spirit of the present disclosure. The following detailed description, therefore, is not to be taken in a limiting sense.

Absorbing polarizers are conventionally prepared by stretching a polyvinyl alcohol (PVA or PVOH) layer in order to align the PVA molecules in the layer and staining the aligned layer with iodine. The iodine molecules align with the oriented PVA molecules. Incident light polarized along the alignment direction (i.e., polarized along a block axis of the polarizer) is absorbed, or partially absorbed, by the iodine and incident light polarized along the orthogonal direction (i.e., polarized along a pass axis of the polarizer) is transmitted, or partially transmitted, through the polarizer.

Another type of polarizer is a polymeric multilayer optical film comprising alternating polymeric layers configured to provide reflection for light polarized along a block axis and to transmit light polarized along a pass axis orthogonal to the block axis. Such films can be prepared by extruding a stack of alternating first and second types of polymeric layers and uniaxially or approximately uniaxially stretching the extruded stack to orient at least one of the first and second types of polymeric layers as generally described in U.S. Pat. No. 5,882,774 (Jonza et al.), for example. Parabolic stretchers or tenter machines such as those described in U.S. Pat. No. 6,916,440 (Jackson et al.), for example, have been used to improve the degree of uniaxial orientation of the birefringent layers in the reflective polarizer.

In some cases, it may be desired to include both an absorbing polarizer and a reflective polarizer in a display application. The reflective polarizer can be used for polarization recycling in a liquid crystal display application, for example, and an absorbing polarizer can be added to the reflective polarizer to improve extinction efficiency. Integrating an absorbing polarizer with a reflective polarizer has been described in U.S. Pat. No. 6,096,375 (Ouderkirk et al.), U.S. Pat. No. 6,697,195 (Weber et al.), U.S. Pat. No. 7,826,009 (Weber et al.), and U.S. Pat. No. 6,111,697 (Kausch et al.), each of which is hereby incorporated herein by reference to the extent that it does not contradict the present description.

According to the present description, it has been found that a polarizer which includes a modified PVA layer made from including a suitable crosslinker in PVA gives improved optical properties if the modified PVA layer is oriented with a higher degree of uniaxial orientation than that achievable using a conventional linear tenter. In particular, the combination of including suitable crosslinker in the PVA layer and drawing the layer by moving opposing edge portions along diverging non-linear paths (for example, using a parabolic tenter to substantially uniaxially orient the layer) to form an absorbing polarizer has been found to simultaneously achieve a low minimum transmittance of normally incident light in a wavelength range of interest and polarized along the block axis (e.g., less than 0.1 percent) and a high maximum transmission transmittance of normally incident light in the wavelength range of interest and polarized along the pass axis (e.g., greater than 75 percent). The wavelength range of interest may be the visible range (400 nm to 700 nm) or may be 540 nm to 640 nm, for example. In some embodiments, the absorbing polarizer has a polarization efficiency (PE) of at least 99.8 percent or at least 99.9 percent. The polarization efficiency is given by Equation 1:

$$PE = \sqrt{(\text{Max}_{Pass} - \text{Min}_{Block}) \div (\text{Max}_{Pass} + \text{Min}_{Block})} \times 100\% \quad \text{(Equation 1)}$$

where $\text{Max}_{Pass}$ is the maximum pass state transmission at normal incidence over the wavelength range of interest and $\text{Min}_{Block}$ is the minimum block state transmission at normal incidence over the wavelength range of interest.

FIG. 1 is a schematic cross-sectional view of polarizer 100 including an oriented polymeric first layer 110 disposed on a substrate 120. The substrate 120 includes a second layer 122 which may be a single polymeric layer, for example, or may be a polymeric multilayer optical film that may be a polymeric multilayer reflective polarizer, for example. In the illustrated embodiment, the substrate 120 further includes an additional layer 124, which may be a retarder (e.g., a quarter-wave retarder), for example. In alternate embodiments, the additional layer 124 is omitted and in some cases the second layer 122 is a retarder. A primer 126, which may optionally be omitted, is disposed between the oriented polymeric first layer 110 and the second layer 122. The primer 126 may be considered a layer of the substrate 120 or may be considered to be a layer between the oriented polymeric first layer 110 and the substrate. A third layer 130 is disposed adjacent the oriented polymeric first layer 110 opposite the second layer 122. In some embodiments, the third layer 130 is or includes a protective layer, an adhesive layer, a retarder, or a combination thereof. In alternate embodiments, the third layer 130 is omitted.

In some embodiments, one or both of the second layer 122 and the third layer 130 is an optically clear polymeric layer, or a plurality of optically clear polymeric layers. Suitable polymeric layers include those made from polyethylene terephthalate (PET), glycol-modified PET (PETg), polyethylene naphthalate (PEN), other polyesters or copolyesters, polycarbonate, and copolymers thereof, for example.

In embodiments where a retarder is included as a layer in a polarizer, the retarder may be a quarter-wave retarder having an in-plane retardance approximately equal to ¼ of a wavelength of interest. The wavelength of interest may be any wavelength in the visible range (400 nm to 700 nm) and may be 550 nm, for example. Unless specified differently, a quarter-wave retarder refers to a retarder having an in-plane retardance of one quarter of a visible light wavelength. In some embodiments, a quarter-wave retarder having an in-plane retardance between 100 nm and 175 nm, or between 125 nm and 150 nm, is used in the polarizer. In some embodiments, a retarder having an in-plane retardance other than one quarter of a visible light wavelength is used. For example, a half-wave retarder or other retarder may be used. In some embodiments, a retarder having an in-plane retardance between 100 nm and 350 nm, or between 200 nm and 350 nm, is used in the polarizer. The in-plane retardance of a layer refers to the absolute value of the difference between two orthogonal in-plane indices of refraction at the wavelength of interest times the thickness of the layer.

The oriented polymeric first layer 110 comprises a dichroic material such as iodine, or other dyes or pigments, which provides absorption in a wavelength range. The wavelength range depends on the type of dye and/or pigment used. In display applications, it is typically desired that the wavelength range include the visible range (400 nm to 700 nm) or at least a substantial portion of the visible range (e.g., 450 nm to 650 nm). Iodine molecules, for example, align with polyvinyl alcohol molecules in the oriented polymeric first layer 110 and thus provide strong absorption for light polarized along the orientation direction while allowing transmission for light of the orthogonal polarization. For example, the x-axis, referring to the x-y-z coordinate system of FIG. 1, may be a block axis for the oriented polymeric first layer 110 and may also be a block axis of second layer 122 in embodiments where second layer 122 is a reflective polarizer. Similarly, the y-axis may be a pass axis for the oriented polymeric first layer 110 and may also be a pass axis of second layer 122 in embodiments where second layer 122 is a reflective polarizer.

The oriented polymeric first layer 110 is preparable from a mixture comprising polyvinyl alcohol and crosslinker. In some embodiments, the crosslinker is included in the mixture at 5 to 40 percent by weight, or at 5 to 30 percent by weight, based on the total weight of the polyvinyl alcohol and crosslinker. In some embodiments, a mixture of polyvinyl alcohol and crosslinker is formed in a solvent and this is coated onto a second layer. In some embodiments, the mixture of polyvinyl alcohol is diluted in the solvent to 10 to 20 percent by weight of solids. In some embodiments, a weight of the crosslinker included in the mixture divided by a sum of the weight of the crosslinker and a weight of the polyvinyl alcohol is in a range of 0.05 to 0.3. In some embodiments, the crosslinker comprises one or more formaldehyde-adducts, such as melamine-formaldehyde and urea-formaldehyde.

Figure 2:
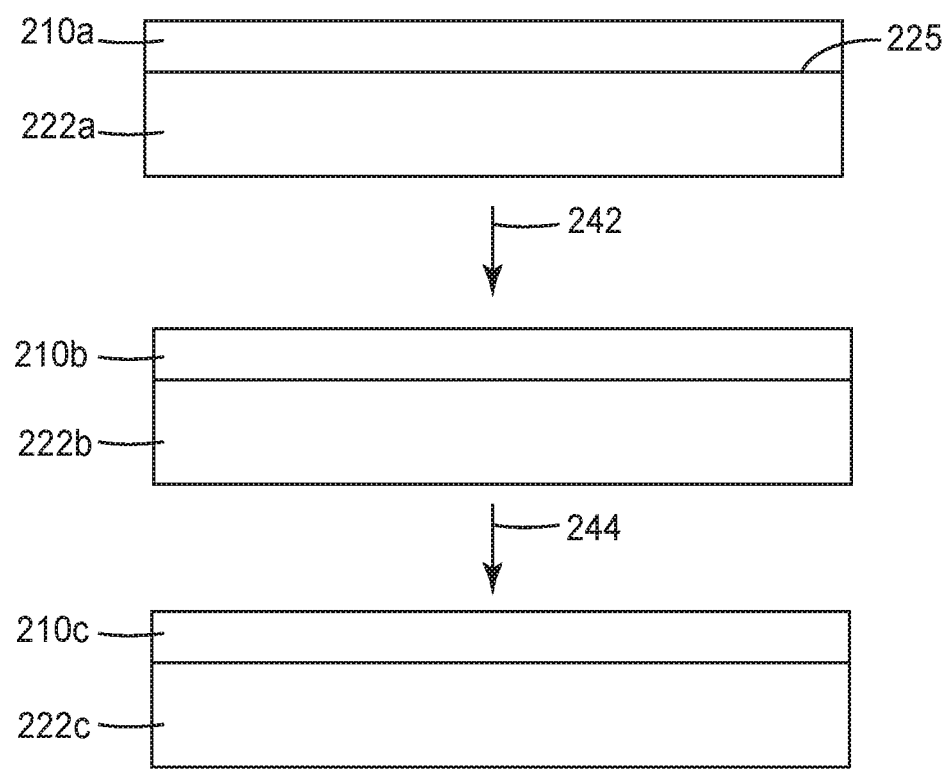
FIG. 2 is an illustration of a process for forming an oriented polymeric layer.

FIG. 2 illustrates a process for forming oriented polymeric first layer 210c. The oriented polymeric first layer 210c is preparable by coating the mixture 210a on a second layer 220a; drying (step 242) the mixture to remove the solvent, thereby forming a dried coating 210b on second layer 222b (which may be the same as second layer 222a or may be altered (e.g., thermally relaxed) by the drying process); substantially uniaxially stretching (step 244) the coated second layer 222b to orient the dried coating 210b, thereby forming the oriented polymeric first layer 210c on second layer 222c (which may be the same as second layer 222b, except for the thickness of the layer which would generally be reduced by the stretching process, or may be altered (e.g., oriented) by the stretching process).

In some embodiments, the mixture is coated with a primer in a single step using, for example, a slide die coater. In other embodiments, a primer is coated onto a major surface 225 of the second layer 220a and then the mixture is coated onto the primed surface of the second layer 220a. In still other embodiments, a primer is not used. In some embodiments, the major surface 225 of the second layer 220a is surface treated prior to coating the primer and in some embodiments, the major surface 225 of the second layer 220a is surface treated and the mixture is coated directly onto the surface treated surface. Suitable surface treatments includes plasma or corona treatments, for example.

The drying step 242 can be carried out at a temperature in a range of 25° C. to 180° C., or 50° C. to 150° C., or 70° C. to 120° C., or 25° C. to 180° C., for example. In some embodiments, the mixture is at a temperature above 150° C. for no more than 5 minutes prior to stretching. In some embodiments, the dried polyvinyl alcohol layer has a thickness of 1.5 to 15 micrometers prior to stretching. In some embodiments, the primer layer has a thickness of 0.45 to 3 micrometers prior to stretching. The stretching step 244 can be carried out at a temperature in a range of 25° C. to 180° C., or 50° C. to 180° C., or 110° C. to 180° C., for example. In some embodiments, the polyvinyl alcohol layer has a thickness of 0.5 to 5 micrometers after the stretching step. In some embodiments, the primer layer has a thickness of 0.15 to 1 micrometers after the stretching step.

The oriented polymeric first layer 110 or 210c can be stained with an absorbing dye such as iodine to provide an absorbing polarizer. Staining an oriented polyvinyl alcohol layer with iodine to make an absorbing polarizer is known in the art and generally described in U.S. Pat. No. 4,166,871 (Shuler), for example. As an alternative to staining an oriented layer, dyes or pigments capable of aligning with the polyvinyl alcohol chains can be added to the mixture prior to coating and stretching to form the oriented layer. In some embodiments, dichroic dyes are added to the mixture to provide absorption in a desired wavelength range.

Figure 3:
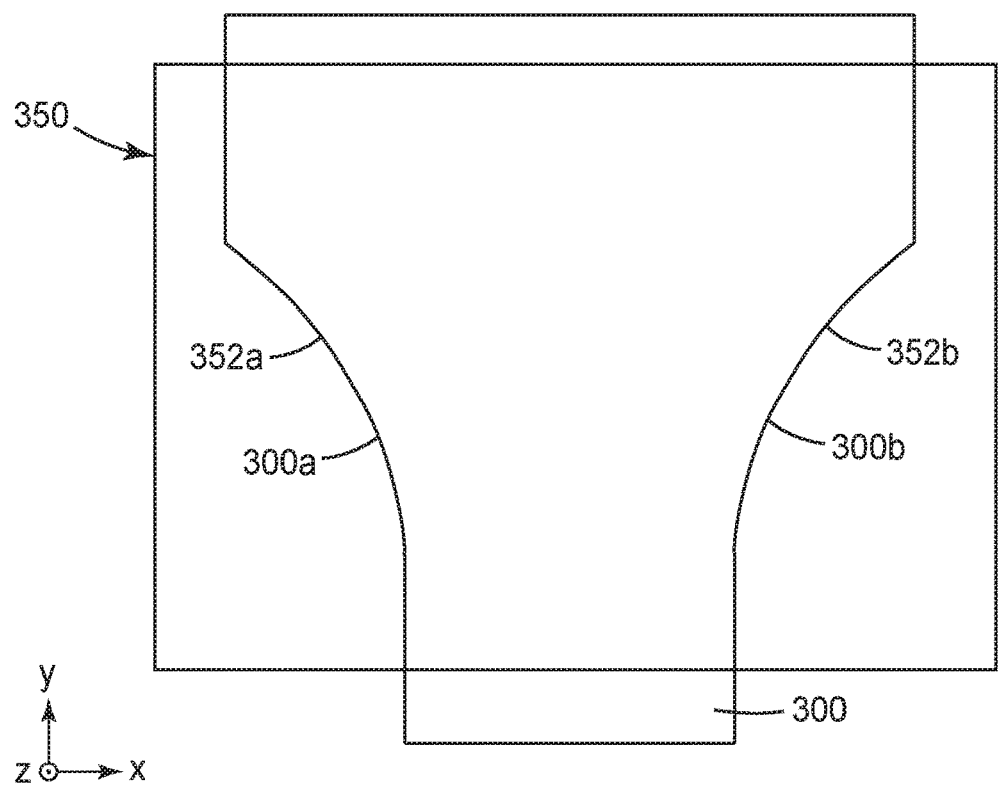
FIG. 3 is a schematic top plan view of a stretcher.

FIG. 3 is a schematic illustration of a stretcher 350 for conveying a coated second layer 300 within a stretcher along a machine direction (y-direction referring to the x-y-z coordinate system in FIG. 3) while holding opposing edge portions 300a and 300b of the coated second layer 300 and stretching the coated second layer 300 within the stretcher 350 by moving the opposing edge portions 300a and 300b along diverging non-linear paths 352a and 352b. In some embodiments, the oriented polymeric first layer 110 is a substantially uniaxially drawn layer, in that for $U=(1/MDDR-1)/(TDDR^{1/2}-1)$, U is at least 0.85, with MDDR being a machine direction (y-direction) draw ratio and TDDR being a transverse direction (x-direction) draw ratio. In some embodiments, the non-linear paths 352a and 352b are parabolic. Further details on stretchers adapted to substantially uniaxially stretch a film is described in U.S. Pat. No. 6,916,440 (Jackson et al.) which is hereby incorporated herein by reference to the extent that it does not contradict the present description. In some embodiments, the layer is drawn with an MDDR in a range of 3 to 8, or 4 to 7, at a temperature in a range of 110° C. to 180° C., or 130° C. to 170° C.

Figure 4:
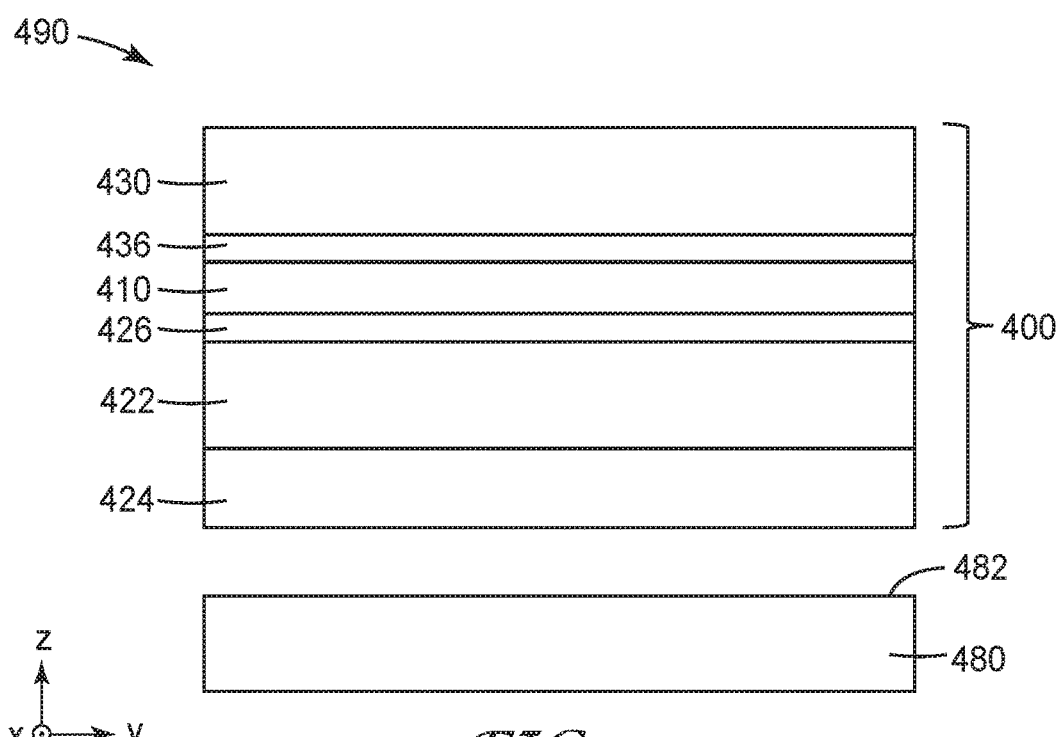
FIGS. 4-5 are schematic cross-sectional views of displays.

The polarizers of the present description are useful in various display applications. FIG. 4 is a schematic cross-sectional view of display 490 including first polarizer 400 and display panel 480. The display 490 may include additional polarizers as described further elsewhere herein. The display 490 is configured to provide light to a viewer located generally in the z-direction of the display 490, referring to the x-y-z coordinate system of FIG. 4. The display panel 480 has a light output side 482 and the first polarizer 400 is disposed adjacent to and facing the light output side 482. In some embodiments, display panel 480 is an organic light emitting diode (OLED) display panel and in some embodiments, display panel 480 is a liquid crystal display (LCD) panel.

First polarizer 400, which may correspond to polarizer 100, includes oriented polymeric first layer 410, second layer 422 which may be a reflective polarizer, for example, and further includes an additional layer 424, which may be a retarder (e.g., a quarter-wave retarder), for example. In alternate embodiments, the additional layer 424 is omitted and in some cases the second layer 422 is a retarder. An optional primer 426 is disposed between the oriented polymeric first layer 410 and the second layer 422. A third layer 430 is disposed adjacent the oriented polymeric first layer 410 opposite the second layer 422. An optional primer 436 is disposed between the oriented polymeric first layer 410 and the third layer 430. In some embodiments, the third layer 430 is or includes a protective layer, an adhesive layer, a retarder, or a combination thereof. In alternate embodiments, the third layer 430 is omitted.

Figure 5:
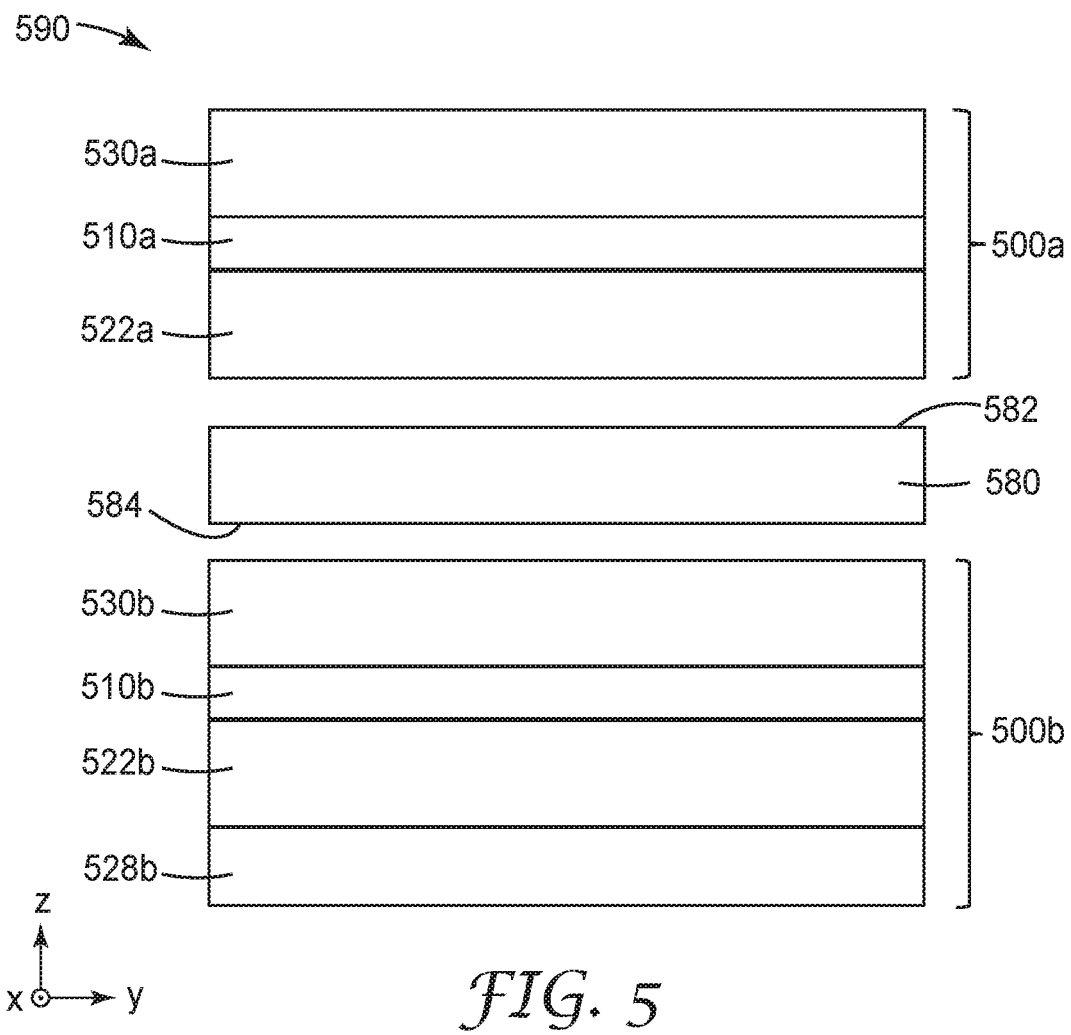

FIG. 5 is a schematic cross-sectional view of display 590 including first polarizer 500a, second polarizer 500b, and display panel 580. The display 590 is configured to provide light to a viewer located generally in the z-direction of the display 590, referring to the x-y-z coordinate system of FIG. 5. The display panel 580 has a light output side 582 and the first polarizer 500a is disposed adjacent to and facing the light output side 582. The display panel 580 also has a light input side 584 and the second polarizer 500b is disposed adjacent to and facing the light input side 584. First polarizer 500a includes oriented polymeric first layer 510a, second layer 522a and third layer 530a. Second polarizer 500b includes oriented polymeric first layer 510b, second layer 522b and third layer 530b and fourth layer 528b. One or more of the layers 522a, 530, 522b, 530b and 528b may be optionally omitted. Primer layers may be disposed between any two immediately adjacent layers shown in FIG. 5. In some embodiments, the third layer 530a and/or 530b is a protective layer, an adhesive layer, a retarder, or a combination thereof. In some embodiments, second layer 522a is a reflective polarizer or a retarder. In some embodiments, second layer 522a is a quarter-wave retarder. In some embodiments, second layer 522a includes both a reflective polarizer and a retarder. In some embodiments, second layer 522b is a reflective polarizer and forth layer 528b is a retarder which may be a quarter-wave retarder. In some embodiments, display panel 580 is a transmissive spatial light modulator such as an LCD panel.

Figure 6:
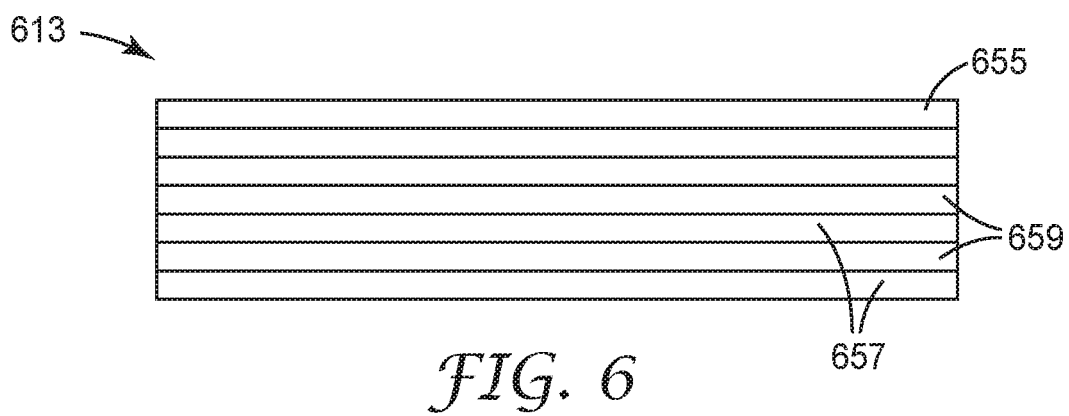
FIG. 6 is a cross-sectional view of a polymeric multilayer optical film.

The oriented polymeric first layer may be disposed on a second layer which may be a polymeric multilayer optical film. FIG. 6 is a cross-sectional view of polymeric multilayer optical film 613 which includes a plurality of first layers 657 alternating with a plurality of second layers 659. In some embodiments, the polymeric multilayer optical film 613 includes at least one dichroic layer 655 which may be an outer layer as illustrated in FIG. 6 or may be one of the alternating layers 657 and 659. Polymeric multilayer optical films which include one or more dichroic layers are further described in U.S. Pat. No. 6,096,375 (Ouderkirk et al.), U.S. Pat. No. 6,697,195 (Weber et al.), U.S. Pat. No. 7,826,009 (Weber et al.), and U.S. Pat. No. 6,111,697 (Kausch et al.).

The following is a list of exemplary embodiments of the present description.

Embodiment 1 is a polarizer comprising an oriented polymeric first layer, the oriented polymeric first layer preparable from a mixture comprising polyvinyl alcohol and crosslinker, the crosslinker included in the mixture at 5 to 40 percent by weight based on the total weight of the polyvinyl alcohol and crosslinker, wherein the oriented polymeric first layer is a substantially uniaxially drawn layer, in that for $U=(1/MDDR-1)/(TDDR^{1/2}-1)$, U is at least 0.85, with MDDR being a machine direction draw ratio and TDDR being a transverse direction draw ratio.

Embodiment 2 is the polarizer of Embodiment 1, wherein the oriented polymeric first layer comprises a dichroic material.

Embodiment 3 is the polarizer of Embodiment 2, wherein the dichroic material comprises iodine.

Embodiment 4 is the polarizer of Embodiment 1, further comprising a second layer, wherein the oriented polymeric first layer is disposed on the second layer.

Embodiment 5 is the polarizer of Embodiment 4, further comprising a third layer, the third layer adjacent the oriented polymeric first layer opposite the second layer.

Embodiment 6 is the polarizer of Embodiment 5, wherein the third layer comprises a protective layer, an adhesive layer, a retarder, or a combination thereof.

Embodiment 7 is the polarizer of Embodiment 5, wherein the second layer comprises a polymeric multilayer optical film.

Embodiment 8 is the polarizer of Embodiment 4, wherein the second layer comprises a polymeric multilayer optical film.

Embodiment 9 is the polarizer of Embodiment 8, wherein the polymeric multilayer optical film comprises a reflective polarizer.

Embodiment 10 is the polarizer of Embodiment 9, wherein a block axis of the oriented polymeric first layer is aligned with a block axis of the reflective polarizer.

Embodiment 11 is the polarizer of Embodiment 8, wherein the polymeric multilayer optical film comprises at least one dichroic layer.

Embodiment 12 is the polarizer of Embodiment 8, wherein a retarder is disposed on the polymeric multilayer optical film opposite the oriented polymeric first layer.

Embodiment 13 is the polarizer of Embodiment 12, wherein the retarder is a quarter-wave retarder.

Embodiment 14 is the polarizer of Embodiment 8, wherein a retarder is disposed on the oriented polymeric first layer opposite the polymeric multilayer optical film.

Embodiment 15 is the polarizer of Embodiment 8, wherein a retarder is disposed between the oriented polymeric first layer and the polymeric multilayer optical film.

Embodiment 16 is the polarizer of Embodiment 4, further comprising a primer disposed between the oriented polymeric first layer and the second layer.

Embodiment 17 is the polarizer of Embodiment 1, wherein a retarder is disposed on the oriented polymeric first layer.

Embodiment 18 is the polarizer of Embodiment 17, wherein the retarder is a quarter-wave retarder.

Embodiment 19a is a display comprising a first polarizer according to any one of Embodiments 1 to 18.

Embodiment 19 is a display comprising a first polarizer according to Embodiment 1.

Embodiment 20 is the display of Embodiment 19, further comprising a display panel having a light output side, the first polarizer disposed adjacent to and facing the light output side.

Embodiment 21 is the display of Embodiment 20, wherein the first polarizer further comprises a retarder disposed between the oriented polymeric first layer and the display panel.

Embodiment 22 is the display of Embodiment 21, wherein the retarder is a quarter-wave retarder.

Embodiment 23 is the display of Embodiment 21, wherein the display panel is an organic light emitting display panel.

Embodiment 24 is the display of Embodiment 20, wherein the first polarizer comprises a second layer disposed between the oriented polymeric first layer and the display panel.

Embodiment 25 is the display of Embodiment 24, wherein the second layer comprises a polymeric multilayer optical film.

Embodiment 26 is the display of Embodiment 25, wherein the polymeric multilayer optical film comprises a reflective polarizer.

Embodiment 27 is the display of Embodiment 25, wherein the first polarizer further comprises a retarder.

Embodiment 28 is the display of Embodiment 27, wherein the polymeric multilayer optical film is disposed between the oriented polymeric first layer and the retarder.

Embodiment 29 is the display of Embodiment 27, wherein the retarder is disposed between the polymeric multilayer optical film and the oriented polymeric first layer.

Embodiment 30 is the display of Embodiment 27, wherein the oriented polymeric first layer is disposed between the polymeric multilayer optical film and the retarder.

Embodiment 31 is the display of Embodiment 27, wherein the retarder is a quarter-wave retarder.

Embodiment 32 is the display of Embodiment 20, wherein the first polarizer further comprises a third layer, the oriented polymeric first layer disposed between the third layer and the display panel.

Embodiment 33 is the display of Embodiment 20, further comprising a second polarizer according to Embodiment 1 disposed adjacent to and facing a light input side of the display panel.

Embodiment 34 is the display of Embodiment 33, wherein the second polarizer comprises a second layer and a third layer disposed between the second layer and the display panel, the oriented polymeric first layer of the second polarizer disposed between the second and third layers of the second polarizer.

Embodiment 35 is the display of Embodiment 34, wherein the second layer of the second polarizer comprises a polymeric multilayer optical film.

Embodiment 36 is the display of Embodiment 35, wherein the polymeric multilayer optical film comprises a reflective polarizer.

Embodiment 37 is the display of Embodiment 34, wherein the third layer of the second polarizer comprises a protective layer, an adhesive layer, a retarder, or a combination thereof.

Embodiment 38 is the display of Embodiment 33, wherein the second polarizer includes a polymeric multilayer optical film, the oriented polymeric first layer of the second polarizer being disposed between the display panel and the polymeric multilayer optical film.

Embodiment 39 is the display of Embodiment 38, wherein the second polarizer further includes a retarder disposed on the polymeric multilayer optical film opposite the oriented polymeric first layer of the second polarizer.

Embodiment 40 is the display of Embodiment 39, wherein the retarder is a quarter-wave retarder.

Embodiment 41 is the display of Embodiment 39, wherein the polymeric multilayer optical film comprises a reflective polarizer.

Embodiment 42 is the display of Embodiment 33, wherein the first polarizer includes a second layer disposed between the display panel and the oriented polymeric first layer of the first polarizer.

Embodiment 43 is the display of Embodiment 42, wherein the second layer of the first polarizer comprises at least one of a polymeric multilayer optical film and a retarder.

Embodiment 44 is the display of Embodiment 33, wherein the display panel is a liquid crystal display panel.

Embodiment 45 is the display of Embodiment 19, further comprising a display panel having a light input side, the first polarizer disposed adjacent to and facing the light input side.

Embodiment 46 is the polarizer of Embodiment 1, wherein the crosslinker comprises one or more formaldehyde-adducts.

Embodiment 47 is the polarizer of Embodiment 1, wherein the crosslinker comprises melamine-formaldehyde and is included in the mixture at 5 to 30 percent by weight.

Embodiment 48 is the polarizer of Embodiment 1, wherein the crosslinker comprises urea-formaldehyde and is included in the mixture at 5 to 30 percent by weight.

Embodiment 49 is the polarizer of Embodiment 1, wherein the oriented polymeric first layer has a minimum transmittance over a wavelength range of 540 nm to 640 nm of less than 0.1 percent for light at normal incidence polarized along a block axis and a maximum transmittance over the wavelength range of 540 nm to 640 nm of at least 75 percent for light at normal incidence polarized along a pass axis orthogonal to the block axis.

Embodiment 49b is a display comprising a first polarizer according to any one of Embodiments 46 to 48.

Embodiment 50 is a method of making a polarizer comprising an oriented polymeric first layer, the method comprising:
forming a mixture of polyvinyl alcohol and a crosslinker in a solvent, a weight of the crosslinker included in the mixture divided by a sum of the weight of the crosslinker and a weight of the polyvinyl alcohol being in a range of 0.05 to 0.3,
coating the mixture onto a second layer;
drying the mixture to remove the solvent, thereby forming a dried coating;
stretching the coated second layer to orient the dried coating, thereby forming the oriented polymeric first layer,
wherein stretching the coated second layer comprises conveying the coated second layer within a stretcher along a machine direction while holding opposing edge portions of the coated second layer and stretching the coated second layer within the stretcher by moving the opposing edge portions along diverging non-linear paths.

Embodiment 51 is the method of Embodiment 50, wherein the non-linear paths are parabolic paths.

Embodiment 52 is the method of Embodiment 50, wherein the stretching step comprises drawing the coated second layer in the machine direction at a draw ratio of MDDR and drawing the coated second layer in a transverse direction at a draw ratio of TDDR, wherein $U=(1/MDDR-1)/(TDDR^{1/2}-1)$ is at least 0.85.

Embodiment 53 is the method of Embodiment 50, wherein the mixture further comprises dichroic dyes.

Embodiment 54 is the method of Embodiment 50, further comprising staining the dried coating.

Embodiment 55 is the method of Embodiment 50, wherein the drying is carried out at a temperature in a range of 25° C. to 180° C.

Embodiment 56 is the method of Embodiment 50, wherein the drying is carried out at a temperature in a range of 50° C. to 150° C.

Embodiment 57 is the method of Embodiment 50, wherein the drying is carried out at a temperature in a range of 70° C. to 120° C.

Embodiment 58 is the method of Embodiment 50, wherein the stretching is carried out at a temperature in a range of 25° C. to 180° C.

Embodiment 59 is the method of Embodiment 50, wherein the stretching is carried out at a temperature in a range of 50° C. to 180° C.

Embodiment 60 is the method of Embodiment 50, wherein the stretching is carried out at a temperature in a range of 110° C. to 180° C.

Embodiment 61 is the method of Embodiment 50, wherein the mixture is at a temperature above 150° C. for no more than 5 minutes prior to stretching.

Embodiment 62 is the method of Embodiment 50, wherein the crosslinker comprises one or more formaldehyde-adducts.

Embodiment 63 is the method of Embodiment 50, wherein the crosslinker comprises melamine-formaldehyde.

Embodiment 64 is the method of Embodiment 50, wherein the crosslinker comprises urea-formaldehyde.

Embodiment 65 is the method of Embodiment 50, wherein the second layer comprises a plurality of alternating polymeric layers.

Embodiment 66 is the method of Embodiment 65, wherein after the stretching step, the second layer comprises a reflective polarizer.

Embodiment 67 is the method of Embodiment 50, wherein the coating step comprises coating a primer directly onto a major surface of the second layer and coating the mixture onto the primer.

Embodiment 68 is the method of Embodiment 67, wherein the primer and the mixture are coated in a single step.

Embodiment 69 is the method of Embodiment 67, further comprising surface treating the major surface of the second layer prior to coating the primer.

Embodiment 70 is the method of Embodiment 50, further comprising surface treating a major surface of the second layer prior to the coating step, the coating step comprising coating the mixture onto the major surface.

Embodiment 71 is the method of Embodiment 50, wherein the oriented polymeric first layer has a minimum transmittance over a wavelength range of 540 nm to 640 nm of less than 0.1 percent for light at normal incidence polarized along a block axis and a maximum transmittance over the wavelength range of 540 nm to 640 nm of at least 75 percent for light at normal incidence polarized along a pass axis orthogonal to the block axis.

EXAMPLES

All parts, percentages, ratios, etc. in the examples are by weight, unless noted otherwise. Materials used in the Examples are listed in Table 1. Other solvents and other reagents used may be obtained from Sigma-Aldrich Chemical Company; Milwaukee, Wis. unless specified differently.

TABLE 1

Materials

| Material | Description | Manufacturer or Preparation Method |
| --- | --- | --- |
| POVAL 28-99 | Polyvinyl alcohol | Kuraray |
| TOMADOL 25-9 | Surfactant | Air Products |
| CYMEL 327 | Crosslinker | Allnex |
| CYMEL 328 | Crosslinker | Allnex |
| GP4864 | Crosslinker | Georgia Pacific |
| WB50 solution | Sulfonated polyester | Prepared as described in U.S. Pat. No. 9,102,131 (Derks et al.) under "Preparation of WB-50 Sulfopolyester Dispersion" |
| EASTEK 1100 Dispersion | Co-polyester dispersion | Eastman |
| CYMEL 350 | Crosslinker | Allnex |

PVOH Coating Solutions

10% solids solutions of POVAL 28-99 grade polyvinyl alcohol (PVOH or PVA) were prepared in water by first charging a temperature controlled kettle with water at room temperature. Under agitation, the PVOH resin was added. The mixture was heated to 90-105° C. and maintained at this temperature for 3 hours under constant agitation. The solution was allowed to cool and drained from the kettle. To the cooled solution surfactant was added at 0.1% of solution. Formaldehyde-adduct type crosslinker was added at 5-40% concentration, based upon PVOH resin solids, with mixing. In some samples, isopropyl alcohol (IPA) was incorporated into the PVOH dissolution process at a concentration of up to 15%. The PVOH solutions are summarized in Tables 2 and 3.

TABLE 2

PVOH Solution

| Component | % of Solution |
|---|---|
| POVAL 28-99 | 10 |
| Water | 74.9-89.9 |
| Surfactant | 0.05-0.5 |
| IPA | 0-15 |

TABLE 3

PVOH Solution with Crosslinker

| Component | % of Solution |
|---|---|
| POVAL 28-99 | 10 |
| Water | 75-94.5 |
| Surfactant | 0.05-0.5 |
| IPA | 0-15 |
| Crosslinker | 0.5-4 |

Primer Coating Solution

A primer solution as summarized in Table 4 was prepared. The solution included a blend of sulfonated polyester solution, co-polyester dispersion, and crosslinker at a ratio of 72.5:10.8:16.7. The resin blend was diluted in water as indicated in Table 4 and surfactant was added at 0.1% of solution.

TABLE 4

Primer Solution

| Component | % of Solution |
|---|---|
| WB50 | 72.1 |
| EASTEK 1100 | 6.2 |
| TOMADOL 25-9 | 0.1 |
| CYMEL 327/328 | 3.7 |
| Water | 17.9 |

Example 1

POVAL 28-99+20% CYMEL 327

An absorbing polarizer film was prepared as follows. A 3 layer cast film was first produced by extrusion of the materials through a film die and onto a chill roll, in the conventional manner for polyester films, upon which it was quenched. The two outer layers were formed from 90/10 coPEN, a polymer composed of 90 mol % polyethylene naphthalate (PEN) and 10 mol % polyethylene terephthalate (PET), and the center layer was formed from a blend of polycarbonate and copolyesters (PC:coPET), wherein the PC:coPET molar ratio was approximately 42.5 mol % PC and 57.5 mol % coPET and had a Tg of 105 degrees centigrade. After the cast film was quenched, a corona treatment was applied followed by directly applying a Primer Coating Solution and subsequently a PVOH Coating Solution to the cast web.

A PVOH Coating Solution containing 20 wt % CYMEL 327 (to PVOH resin solids), 10% IPA and 0.1% surfactant (on total solution) was prepared and applied to the cast web. The solvent was removed at elevated temperatures (85° C. for 45 seconds) resulting in dry coating thicknesses of 6.5 micrometers and 1.95 micrometers for PVOH and primer layers respectively, as calculated from the flow rate. Following coating, the coated cast was stretched in a parabolic tenter as described in U.S. Pat. No. 6,916,440 (Jackson et al.) at temperatures and draw ratios similar to those described in Example 2A of U.S. Pat. App. Pub. No. 2007/0047080 (Stover et al.) The resultant integrated polarizer precursor film had a physical thickness, as measured by capacitance gauge model PR2000 by SolveTech, of approximately 40 micrometers including a PVOH layer thickness of approximately 2 micrometers.

The precursor film was subjected to an aqueous iodine staining bath process resulting in an absorbing polarizer. The staining process was carried out as follows. The precursor film was first passed through a staining bath of potassium iodide and iodine in water at a ratio of 60:1 w/w at 30° C. for a dwell time of 34 seconds. After the staining bath, the precursor film was passed through an aqueous boration bath of boric acid and borax at a ratio of 70:30 w/w at 60° C. The film was exposed to this bath for 42 seconds. Finally, the precursor film was rinsed in a water bath for 24 seconds held at room temperature to remove any excess salts. The transmission spectra for both the block and pass state were collected using a LAMBDA 1050 UV/Vis/NIR Spectrophotometer form PerkinElmer and the polarization efficiency calculated according to Equation 1.

The block state transmission of the polarizer was suppressed from approximately 1 to 0.1% T and broadened compared Comparative Example 5 which did not include crosslinker, resulting in an improvement of the polarization efficiency.

Example 2

POVAL 28-99+20% CYMEL 328

An absorbing polarizer film was made by applying a PVOH coating solution to a cast web as in Example 1 except as indicated in the following.

A PVOH solution containing 20 wt % CYMEL 328 (to PVOH resin solids), 10% IPA and 0.1% surfactant (on total solution) was prepared and coated onto the cast web. The solvent was removed at elevated temperatures (85° C. for 45 seconds) resulting in dry coating thicknesses of 6.5 micrometers and 1.95 micrometers for PVOH and primer layers respectively. Following coating, the coated cast was stretched in a parabolic tenter as described in U.S. Pat. No. 6,916,440 (Jackson et al.) at temperatures and draw ratios similar to those described in Example 2A of U.S. Pat. App. Pub. No. 2007/0047080 (Stover et al.). The resultant integrated polarizer precursor film had a physical thickness, as measured by capacitance gauge model PR2000 by SolveTech, of approximately 40 micrometers including a PVOH layer thickness of approximately 2 micrometers.

The precursor film was subjected to an aqueous iodine staining bath process resulting in an absorbing polarizer. The transmission spectra for both the block and pass state were collected using a LAMBDA 1050 UV/Vis/NIR Spectrophotometer form PerkinElmer and the polarization efficiency calculated according to Equation 1.

The block state transmission of the polarizer was suppressed from approximately 1 to <0.1% T and broadened compared to Comparative Example 5 which did not include crosslinker, resulting in an improvement of the polarization efficiency.

Example 3

POVAL 28-99+10% GP4864

An absorbing polarizer film was made by applying a PVOH coating solution to a cast web as in Example 1 except as indicated in the following.

A PVOH solution containing 10 wt % GP4864 (to PVOH resin solids), 10% IPA and 0.1% surfactant (on total solution) was prepared and coated onto to the cast web. The solvent was removed at elevated temperatures (85° C. for 45 seconds) resulting in dry coating thicknesses of 6.5 micrometers and 1.95 micrometers for PVOH and primer layers respectively. Following coating, the coated cast was stretched in a parabolic tenter as described in U.S. Pat. No. 6,916,440 (Jackson et al.) at temperatures and draw ratios similar to those described in Example 2A of U.S. Pat. App. Pub. No. 2007/0047080 (Stover et al.). The resultant integrated polarizer precursor film had a physical thickness, as measured by capacitance gauge model PR2000 by SolveTech, of approximately 40 micrometers including a PVOH layer thickness of approximately 2 micrometers.

The precursor film was subjected to an aqueous iodine staining bath process resulting in an absorbing polarizer. The transmission spectra for both the block and pass state were collected using a LAMBDA 1050 UV/Vis/NIR Spectrophotometer form PerkinElmer and the polarization efficiency calculated according to Equation 1.

The block state transmission of the polarizer was suppressed from approximately 1 to <0.05% T and broadened compared to Comparative Example 5 which did not include crosslinker, resulting in an improvement of the polarization efficiency.

Example 4

POVAL 28-99+30% GP4864

An absorbing polarizer film was made by applying a PVOH coating solution to a cast web as in Example 1 except as indicated in the following.

A PVOH solution containing 30 wt % GP4864 (to PVOH resin solids), 10% IPA and 0.1% surfactant (on total solution) was prepared and coated onto the cast web. The solvent was removed at elevated temperatures (85° C. for 45 seconds) resulting in dry coating thicknesses of 6.5 micrometers and 1.95 micrometers for PVOH and primer layers respectively. Following coating, the coated cast was stretched in a parabolic tenter as described in U.S. Pat. No. 6,916,440 (Jackson et al.) at temperatures and draw ratios similar to those described in Example 2A of U.S. Pat. App. Pub. No. 2007/0047080 (Stover et al.). The resultant integrated polarizer precursor film had a physical thickness, as measured by capacitance gauge model PR2000 by SolveTech, of approximately 40 micrometers including a PVOH layer thickness of approximately 2 micrometers.

The precursor film was subjected to an aqueous iodine staining bath process resulting in an absorbing polarizer. The transmission spectra for both the block and pass state were collected using a LAMBDA 1050 UV/Vis/NIR Spectrophotometer form PerkinElmer and the polarization efficiency calculated according to Equation 1.

The block state transmission of the polarizer was suppressed from approximately 1 to <0.01% T and broadened compared to Comparative Example 5 which did not include crosslinker, resulting in an improvement of the polarization efficiency.

Comparative Example 1

POVAL 28-99+20% CYMEL 327, Standard Tenter

An absorbing polarizer film was made by applying a PVOH coating solution to a cast web as in Example 1 except as indicated in the following.

A PVOH solution containing 20 wt % CYMEL 327 (to PVOH resin solids), 10% IPA and 0.1% surfactant (on total solution) was prepared and coated onto the cast web. The solvent was removed at elevated temperatures (85° C. for 45 seconds) resulting in dry coating thicknesses of 6.5 micrometers and 1.95 micrometers for PVOH and primer layers respectively. Following coating, the coated cast was stretched in a standard tenter as described in U.S. Pat. No. 5,882,774 (Jonza et al.). The resultant integrated polarizer precursor film had a physical thickness, as measured by capacitance gauge model PR2000 by SolveTech, of approximately 40 micrometers including a PVOH layer thickness of approximately 1 micrometer.

The precursor film was subjected to an aqueous iodine staining bath process resulting in an absorbing polarizer. The transmission spectra for both the block and pass state were collected using a LAMBDA 1050 UV/Vis/NIR Spectrophotometer from PerkinElmer and the polarization efficiency calculated according to Equation 1.

The block state transmission of the resulting polarizer displayed no benefit over Comparative Example 6 having a slightly higher block state and a narrowing of the spectral breadth. The calculated polarization efficiency was lower than that of Comparative Example 6 with no crosslinker.

Comparative Example 2

POVAL 28-99+20% CYMEL 328, Standard Tenter

An absorbing polarizer film was made by applying a PVOH coating solution to a cast web as in Example 1 except as indicated in the following.

A PVOH solution containing 20 wt % CYMEL 328 (to PVOH resin solids), 10% IPA and 0.1% surfactant (on total solution) was prepared and coated onto the cast web. The solvent was removed at elevated temperatures (85° C. for 45 seconds) resulting in dry coating thicknesses of 6.5 micrometers and 1.95 micrometers for PVOH and primer layers respectively. Following coating, the coated cast was stretched in a standard tenter as described in U.S. Pat. No. 5,882,774 (Jonza et al.). The resultant integrated polarizer precursor film had a physical thickness, as measured by capacitance gauge model PR2000 by SolveTech, of approximately 40 micrometers including a PVOH layer thickness of approximately 1 micrometer.

The precursor film was subjected to an aqueous iodine staining bath process resulting in an absorbing polarizer. The transmission spectra for both the block and pass state were collected using a LAMBDA 1050 UV/Vis/NIR Spectrophotometer from PerkinElmer and the polarization efficiency calculated according to Equation 1.

The block state transmission of the resulting polarizer displayed no benefit over Comparative Example 6 having a slightly higher block state and a narrowing of the spectral breadth. The calculated polarization efficiency was lower than that of Comparative Example 6 with no crosslinker.

Comparative Example 3

POVAL 28-99+10% GP4864, Standard Tenter

An absorbing polarizer film was made by applying a PVOH coating solution to a cast web as in Example 1 except as indicated in the following.

A PVOH solution containing 10 wt % GP4864 (to PVOH resin solids), 10% IPA and 0.1% surfactant (on total solution) was prepared and coated onto the cast web. The solvent was removed at elevated temperatures (85° C. for 45 seconds) resulting in dry coating thicknesses of 6.5 micrometers and 1.95 micrometers for PVOH and primer layers respectively. Following coating, the coated cast was stretched in a standard tenter as described in U.S. Pat. No. 5,882,774 (Jonza et al.). The resultant integrated polarizer precursor film had a physical thickness, as measured by capacitance gauge model PR2000 by SolveTech, of approximately 40 micrometers including a PVOH layer thickness of 1 micrometer.

The precursor film was subjected to an aqueous iodine staining bath process resulting in an absorbing polarizer. The transmission spectra for both the block and pass state were collected and the polarization efficiency calculated according to Equation 1.

The block state transmission of the resulting polarizer displayed no benefit over Comparative Example 6 having a slightly higher block state. The calculated polarization efficiency was lower than that of Comparative Example 6 with no crosslinker.

Comparative Example 4

POVAL 28-99+30% GP4864, Standard Tenter

An absorbing polarizer film was made by applying a PVOH coating solution to a cast web as in Example 1 except as indicated in the following.

A PVOH solution containing 30 wt % GP4864 (to PVOH resin solids), 10% IPA and 0.1% surfactant (on total solution) was prepared and coated onto the cast web. The solvent was removed at elevated temperatures (85° C. for 45 seconds) resulting in dry coating thicknesses of 6.5 micrometers and 1.95 micrometers for PVOH and primer layers respectively. Following coating, the coated cast was stretched in a standard tenter as described in U.S. Pat. No. 5,882,774 (Jonza et al.). The resultant integrated polarizer precursor film had a physical thickness, as measured by capacitance gauge model PR2000 by SolveTech, of approximately 40 micrometers including of a PVOH layer thickness of approximately 1 micrometer.

The precursor film was subjected to an aqueous iodine staining bath process resulting in an absorbing polarizer. The transmission spectra for both the block and pass state were collected using a LAMBDA 1050 UV/Vis/NIR Spectrophotometer from PerkinElmer and the polarization efficiency calculated according to Equation 1.

The block state transmission of the resulting polarizer displayed no benefit over Comparative Example 6 having a slightly higher block state. The calculated polarization efficiency was lower than that of Comparative Example 6 with no crosslinker.

Comparative Example 5

POVAL 28-99 (Reference with Parabolic Tenter)

A substrate was prepared as follows. A 3 layer cast film was first produced by extrusion of the materials through a film die and onto a chill roll, in the conventional manner for polyester films, upon which it was quenched. The cast film two outer layers were formed from 90/10 coPEN, a polymer composed of 90 mol % polyethylene naphthalate (PEN) and 10 mol % polyethylene terephthalate (PET), and the center layer was formed from a blend of polycarbonate and copolyesters (PC:coPET), where the PC:coPET molar ratio was approximately 42.5 mol % PC and 57.5 mol % coPET and had a Tg of 105 degrees centigrade. After the cast film was quenched, corona treatment was applied followed by directly applying a Primer coating solution and subsequently a PVOH coating solution containing 10% IPA and 0.1% surfactant (on total solution) to the cast web.

The solvent was removed at elevated temperatures (85° C. for 45 seconds) resulting in dry coating thicknesses of 6.5 micrometers and 1.95 micrometers for PVOH and primer layers respectively. Following coating, the coated cast was stretched in a parabolic tenter as described in U.S. Pat. No. 6,916,440 (Jackson et al.) at temperatures and draw ratios similar to those described in Example 2A of U.S. Pat. App. Pub. No. 2007/0047080 (Stover et al.). The resultant integrated polarizer precursor film had a physical thickness, as measured by capacitance gauge model PR2000 by SolveTech, of approximately 40 micrometers including a PVOH layer thickness of approximately 2 micrometers.

The precursor film was subjected to an aqueous iodine staining bath process resulting in an absorbing polarizer. The transmission spectra for both the block and pass state were collected and the polarization efficiency calculated according to Equation 1.

Comparative Example 6

POVAL 28-99 Control, (Reference for Standard Tenter)

An absorbing polarizer film was made by applying a PVOH coating solution to a cast web as in Comparative Example 5 except as indicated in the following.

Prior to coating, the cast film was corona treated to improve adhesion. The solvent was removed at elevated temperatures (85° C. for 45 seconds) resulting in dry coating thicknesses of 6.5 micrometers and 1.95 micrometers for PVOH and primer layers respectively. Following coating, the coated cast was stretched in a standard tenter as described in U.S. Pat. No. 5,882,774 (Jonza et al.). The resultant integrated polarizer precursor film had a physical thickness, as measured by capacitance gauge model PR2000 by SolveTech, of approximately 40 micrometers including a PVOH layer thickness of approximately 1 micrometer.

The precursor film was subjected to an aqueous iodine staining bath process resulting in an absorbing polarizer. The transmission spectra for both the block and pass state were collected using a LAMBDA 1050 UV/Vis/NIR Spectrophotometer from PerkinElmer and the polarization efficiency calculated according to Equation 1.

Comparative Example 7

POVAL 28-99 Control on RP

An integrated absorbing-reflective polarizer was prepared as follows. A single multilayer optical packet was co-extruded and included 275 alternating layers of 90/10 coPEN, a polymer composed of 90 mol % polyethylene naphthalate (PEN) and 10 mol % polyethylene terephthalate (PET), and a low index isotropic layer, which was made with a blend of polycarbonate and copolyesters (PC:coPET) such that the index was about 1.57 and remained substantially isotropic upon uniaxial orientation, where the PC:coPET molar ratio was approximately 42.5 mol % PC and 57.5 mol % coPET and had a Tg of 105 degrees centigrade. The 90/10 PEN and PC:coPET polymers were fed from separate extruders to a multilayer coextrusion feedblock, in which they were assembled into a packet of 275 alternating optical layers, plus a protective boundary layer of the PC:coPET, on each side, for a total of 277 layers. The multilayer melt was then cast through a film die onto a chill roll, in the conventional manner for polyester films, upon which it was quenched. To the cast web, a polyvinyl alcohol (PVOH) coating was adhered.

Prior to coating, the cast film was corona treated. The solvent was removed at elevated temperatures (85° C. for 45 seconds) resulting in dry coating thicknesses of 9 micrometers and 0.75 micrometers for PVOH and primer layers respectively. Following coating, the coated cast was stretched in a parabolic tenter as described in U.S. Pat. No. 6,916,440 (Jackson et al.) at temperatures and draw ratios similar to those described in Example 2A of U.S. Pat. App. Pub. No. 2007/0047080 (Stover et al.). The resultant integrated polarizer precursor film had a physical thickness, as measured by capacitance gauge model PR2000 by SolveTech, of approximately 37 micrometers including a PVOH layer thickness of approximately 3 micrometers.

The precursor film was subjected to an aqueous iodine staining bath process resulting in an absorbing polarizer. The transmission spectra for both the block and pass state were collected using a LAMBDA 1050 UV/Vis/NIR Spectrophotometer from PerkinElmer and the polarization efficiency calculated according to Equation 1.

Example 5

28-99+20% CYMEL 327 on RP

An integrated absorbing-reflective polarizer was made by applying a PVOH coating solution to a cast film as in Comparative Example 7 except as indicated in the following.

A single multilayer optical packet was co-extruded and included 275 alternating layers of 90/10 coPEN, a polymer composed of 90 mol % polyethylene naphthalate (PEN) and 10 mol % polyethylene terephthalate (PET), and a low index isotropic layer, which was made with a blend of polycarbonate and copolyesters (PC:coPET) such that the index was about 1.57 and remained substantially isotropic upon uniaxial orientation, where the PC:coPET molar ratio was approximately 42.5 mol % PC and 57.5 mol % coPET and had a Tg of 105 degrees centigrade. The 90/10 PEN and PC:coPET polymers were fed from separate extruders to a multilayer coextrusion feedblock, in which they were assembled into a packet of 275 alternating optical layers, plus a protective boundary layer of the PC:coPET, on each side, for a total of 277 layers. The multilayer melt was then cast through a film die onto a chill roll, in the conventional manner for polyester films, upon which it was quenched. To the cast web, a polyvinyl alcohol (PVOH) coating was adhered.

A PVOH solution containing 20 wt % CYMEL 327 (to PVOH resin solids) was prepared and coated onto the cast web. The solvent was removed at elevated temperatures (85° C. for 45 seconds) resulting in dry coating thicknesses of 9 micrometers and 0.75 micrometers for PVOH and primer layers respectively. Following coating, the coated cast was stretched in a parabolic tenter as described in U.S. Pat. No. 6,916,440 (Jackson et al.) at temperatures and draw ratios similar to those described in Example 2A of U.S. Pat. App. Pub. No. 2007/0047080 (Stover et al.). The resultant integrated polarizer precursor film had a physical thickness, as measured by capacitance gauge model PR2000 by SolveTech, of approximately 37 micrometers including a PVOH layer thickness of approximately 3 micrometers.

The precursor film was subjected to an aqueous iodine staining bath process resulting in an absorbing polarizer. The transmission spectra for both the block and pass state were collected using a LAMBDA 1050 UV/Vis/NIR Spectrophotometer from PerkinElmer and the polarization efficiency calculated according to Equation 1.

The block state transmission of the polarizer was suppressed and broadened in comparison to Comparative Example 7 which did not include crosslinker, resulting in an improvement of the polarization efficiency.

Figure 7:
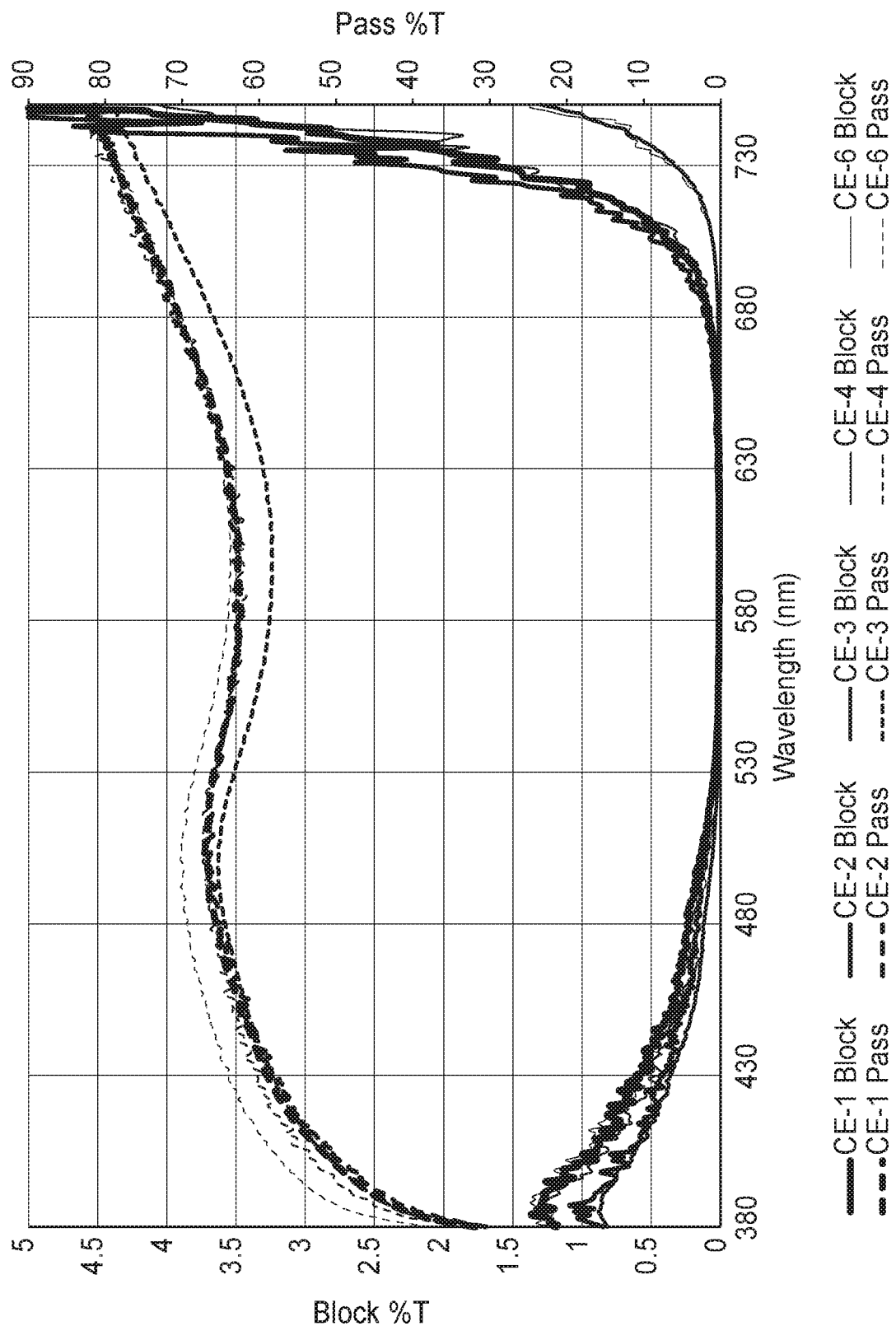
FIGS. 7-9 are plots of transmission spectra for various polarizers.
Figure 8:
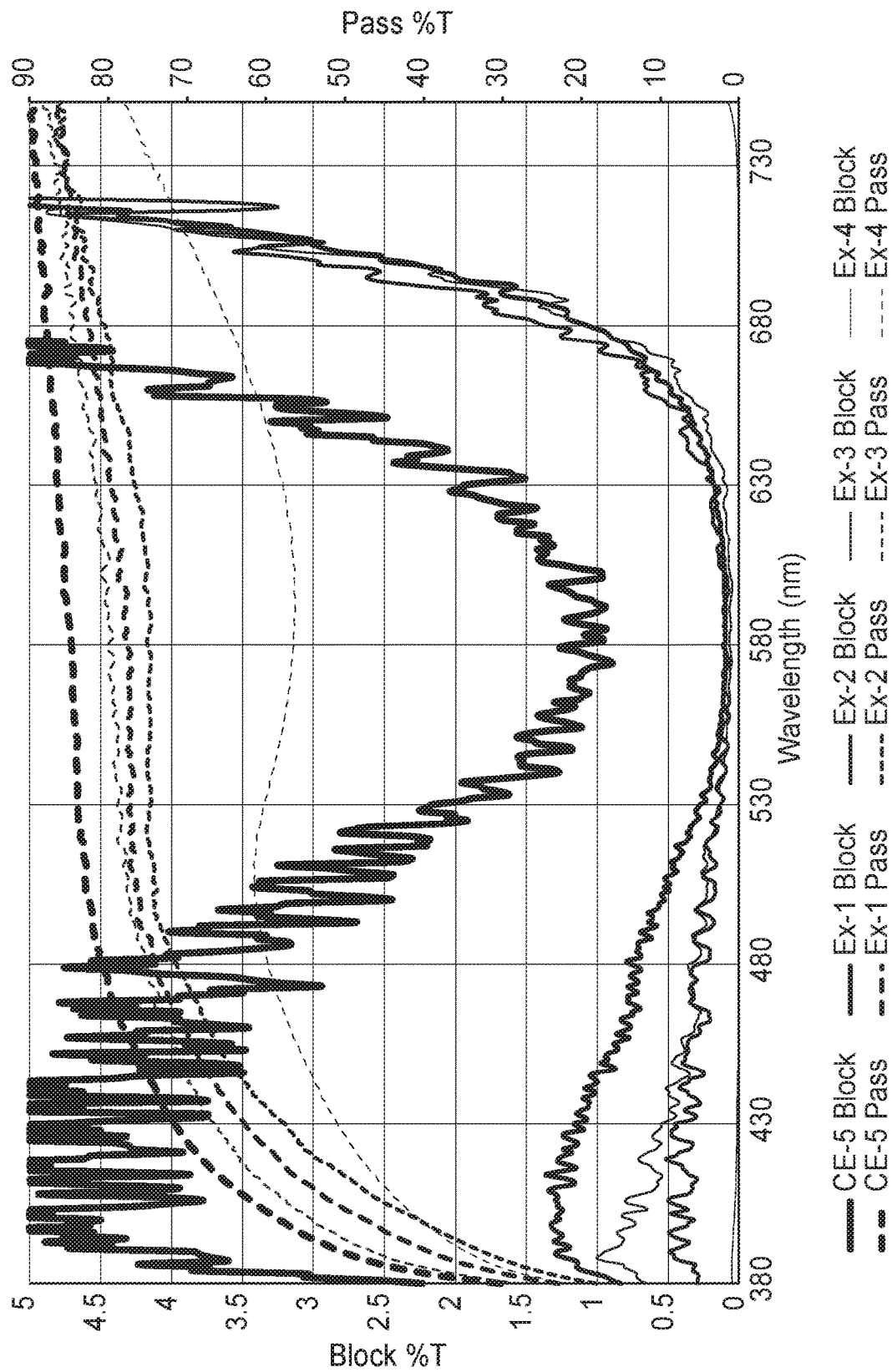
Figure 9:
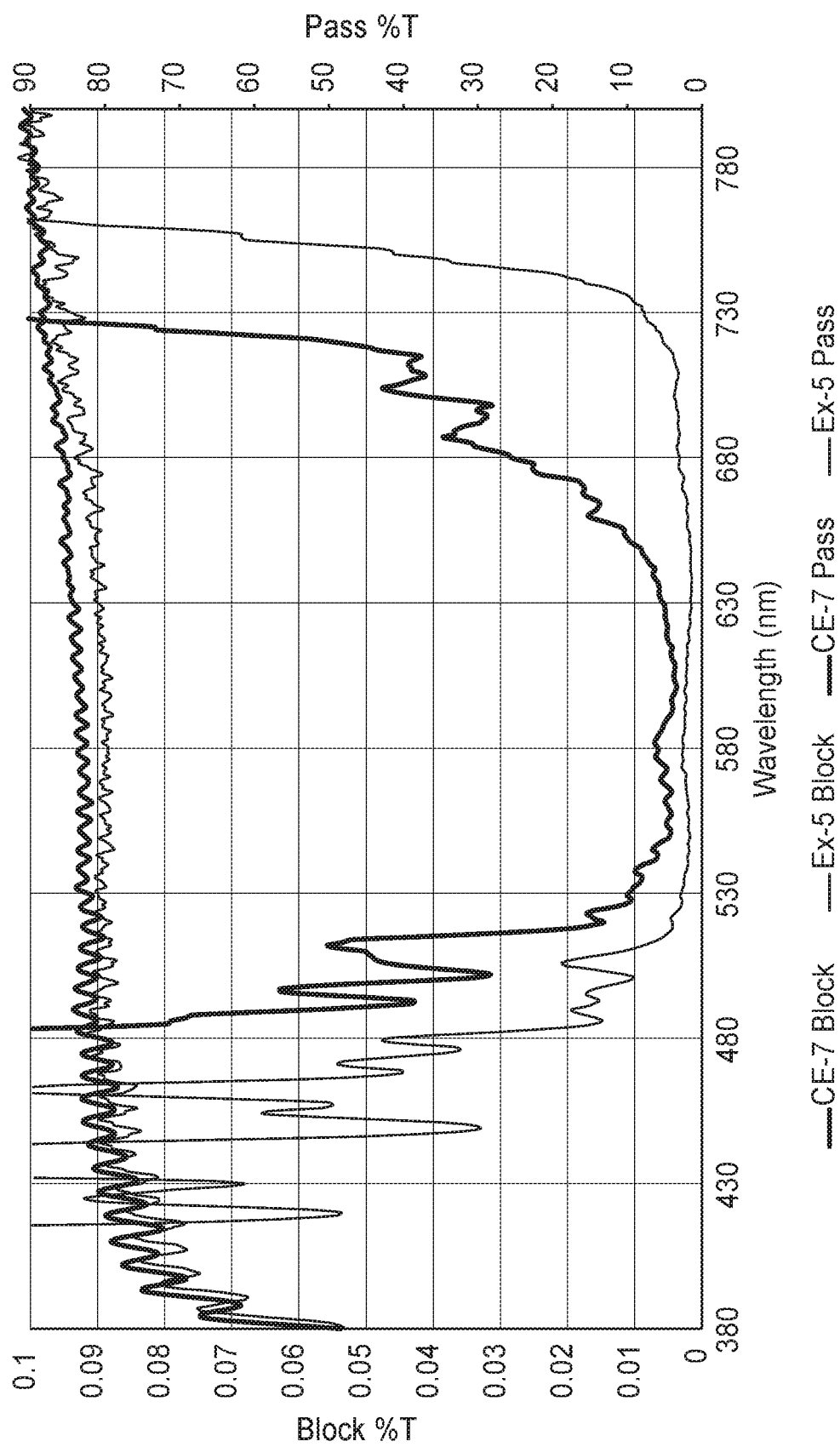

The transmission spectra comparing polarizer performance with and without crosslinker for standard tentering, parabolic tentering and multilayers are compared in FIGS. 7, 8 and 9, respectively. The transmission spectra for the standard tentering process (Comparative Examples 1-4 versus Comparative Example 6) are depicted in FIG. 7. From this figure, one notices little difference with the addition of crosslinker to the resultant spectra. The transmission spectra comparing the polarizer performance with and without crosslinker for the parabolic tentering process (Examples 1-4 vs Comparative Example 5) are depicted in FIG. 8. For these samples made with the parabolic tentering process, there was a clear contrast with the addition of crosslinker to the formulation. The transmission spectra comparing the polarizer performance with and without crosslinker for the multilayer film cases (Example 5 versus Comparative Example 7) are depicted in FIG. 9.

The optical performance properties for the examples are summarized in Table 5. Comparing the results from Comparative Examples 1-4 with Comparative Example 6 shows little distinction with the addition of crosslinker when using standard/traditional stretching processes. In contrast, comparing the results from Examples 1-4 with Comparative Example 5 shows significant impact on block state transmission (Min Tb %) and polarization efficiency (Max PE %) with the addition of crosslinker.

TABLE 5

Optical Performance Properties

| Example Label | Layers | Cross-linker | Stretch Mode | Min Tb [%] | Max Tp [%] | Max PE [%] |
|---|---|---|---|---|---|---|
| | | | | Measured over 540-640 nm | | |
| Example 1 | 3 layer | 20% CYMEL 327 | parabolic | 0.0970 | 80.40 | 99.875 |
| Comparative Example 1 | 3 layer | 20% CYMEL 327 | standard | 0.0082 | 64.9947 | 99.9870 |
| Example 2 | 3 layer | 20% CYMEL 328 | parabolic | 0.0644 | 77.40 | 99.914 |
| Comparative Example 2 | 3 layer | 20% CYMEL 328 | standard | 0.0087 | 65.7110 | 99.9862 |
| Example 3 | 3 layer | 10% GP4864 | parabolic | 0.0479 | 82.32 | 99.940 |
| Comparative Example 3 | 3 layer | 10% GP4864 | standard | 0.0094 | 61.9525 | 99.9839 |
| Example 4 | 3 layer | 30% GP4864 | parabolic | 0.0043 | 59.19 | 99.992 |
| Comparative Example 4 | 3 layer | 30% GP4864 | standard | 0.0146 | 65.5461 | 99.9764 |
| Example 5 | Multi-layer | 20% CYMEL 327 | standard | 0.0015 | 91.58 | 99.998 |

TABLE 5-continued

Optical Performance Properties

| | | | | Measured over 540-640 nm | | |
|---|---|---|---|---|---|---|
| Example Label | Layers | Cross-linker | Stretch Mode | Min Tb [%] | Max Tp [%] | Max PE [%] |
| Comparative Example 5 | 3 layer | None | parabolic | 0.8984 | 86.61 | 98.943 |
| Comparative Example 6 | 3 layer | None | standard | 0.0076 | 67.2173 | 99.9884 |
| Comparative Example 7 | Multi-layer | None | parabolic | 0.0037 | 91.32 | 99.996 |

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A polarizer comprising an oriented polymeric first layer, the oriented polymeric first layer preparable from a mixture comprising polyvinyl alcohol and crosslinker, the crosslinker included in the mixture at 5 to 40 percent by weight based on the total weight of the polyvinyl alcohol and crosslinker, wherein the oriented polymeric first layer is a substantially uniaxially drawn layer, in that for $U=(1/MDDR-1)/(TDDR^{1/2}-1)$, U is at least 0.85, with MDDR being a machine direction draw ratio and TDDR being a transverse direction draw ratio.

2. The polarizer of claim 1, wherein the oriented polymeric first layer comprises a dichroic material.

3. The polarizer of claim 1, further comprising a second layer, wherein the oriented polymeric first layer is disposed on the second layer.

4. The polarizer of claim 3, wherein the second layer comprises a polymeric multilayer optical film.

5. The polarizer of claim 4, wherein the polymeric multilayer optical film comprises a reflective polarizer.

6. The polarizer of claim 5, wherein the polymeric multilayer optical film comprises at least one dichroic layer.

7. The polarizer of claim 5, wherein a retarder is disposed on the polymeric multilayer optical film opposite the oriented polymeric first layer.

8. The polarizer of claim 1, wherein the crosslinker comprises one or more formaldehyde-adducts.

9. The polarizer of claim 1, wherein the crosslinker comprises melamine-formaldehyde and is included in the mixture at 5 to 30 percent by weight.

10. The polarizer of claim 1, wherein the crosslinker comprises urea-formaldehyde and is included in the mixture at 5 to 30 percent by weight.

11. The polarizer of claim 1, wherein the oriented polymeric first layer has a minimum transmittance over a wavelength range of 540 nm to 640 nm of less than 0.1 percent for light at normal incidence polarized along a block axis and a maximum transmittance over the wavelength range of 540 nm to 640 nm of at least 75 percent for light at normal incidence polarized along a pass axis orthogonal to the block axis.

12. A display comprising the polarizer of claim 1.

* * * * *